June 21, 1949.  S. VERNET  2,474,132
PISTON SEALING MEANS
Filed Sept. 7, 1945

INVENTOR.
Sergius Vernet
BY
Andrew K. Foulds
his ATTORNEY

Patented June 21, 1949

2,474,132

UNITED STATES PATENT OFFICE 2,474,132

PISTON SEALING MEANS

Sergius Vernet, Yellow Springs, Ohio

Application September 7, 1945, Serial No. 614,930

6 Claims. (Cl. 309—23)

This invention relates to improvements in means for sealing the clearance space between cooperable piston and cylinder members and more particularly to a sealing structure for hydraulically operated pistons.

An object of this invention is to provide a sealing ring of rubber-like material which is effective to prevent leakage at high piston operating pressures.

Another object is to provide means which will prevent chafing or sluffing off of portions of the sealing face of the ring.

Another object is to provide means to prevent extrusion of the sealing ring into the clearance space.

The foregoing and other objects will be apparent from the following description of this specification.

In the accompanying drawings, to be taken as a part of this specification, there are fully and clearly illustrated various preferred embodiments of the invention, in which drawings.

Figure 1:
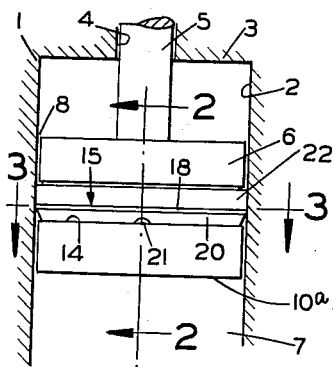
Figure 1 is a view in longitudinal section of a hydraulic cylinder containing a fluid pressure operated piston, shown in elevation and equipped with one form of clearance sealing means of this invention.

Referring to Figs. 1 to 4, the numeral 1 designates the cylinder of a hydraulic press or the like which has an internally cylindrical side wall 2 and an end wall 3 through which there is a guide aperture 4 for the press operating rod 5. Reciprocal in the cylinder 1, there is a piston 6 connected to and for operating the rod 5. The piston 6 cooperates with the cylinder 1 to provide a pressure chamber 7 for the piston operating fluid which is supplied to and withdrawn from the chamber by pipes, as is well understood in the art. The piston 6 has a clearance space 8 therearound between its cylindrical wall and the cylinder wall 2, the space being of the nature of say ten thousandths of an inch. The piston is of solid one piece construction, having substantially midway of its length a circumferential groove 9 having its top face or wall 10 normal to the clearance space and having its lower face or wall 11 diverging or inclined downward toward the piston pressure receiving face 10ᵃ and from the groove base 12 so that the groove is of generally V-shaped form. Intersecting the groove 9 there is a circumferential groove 13 which is shallower or of less depth than the groove 9 and which provides an annular circumferential step or shoulder 14 on the fluid pressure receiving side of the piston groove 9. The radial length of the groove 9 may be about one hundred twenty-five thousandths of an inch deep and the width of the groove base longitudinally of the piston, say about twenty-five thousandths of an inch wide. Positioned in the groove 9, there is a sealing ring 15 of rubber-like material, preferably Ameripol or other synthetic material having a hardness of say 60 durometer reading, so that it is stretchable over the piston for insertion in and for contraction into the groove 9. The body portion 16 of the ring is flat so that it cooperates with the groove 9 to provide a pressure space or chamber 17 in the groove 9 on the pressure receiving side of the piston 6. The ring 15 has a circumferential lip 18 which engages the cylinder wall 2 and extends across the clearance space 8. The lip 18 is preferably of less thickness or width longitudinally of the piston than is the ring body 16, thereby reducing friction against the wall 2. The fluid pressure receiving edge 19 of the ring is bolstered or buttressed by an annular flange 20 extending from the pressure receiving side of the ring and which seats on the step 14. Across the lower edge of the ring flange 20 there are a plurality of transverse radial notches or recesses 21 of greater height than the groove 13 to provide ports for admission of the piston operating fluid from the clearance space 8 to the ring expanding pressure chamber 17. The ring 15 is backed by a reinforcing ring or annular abutment member 22 which may be of a harder rubber-like material, such as Ameripol, than the ring 15. This ring 22 may have a hardness of say 90 durometer reading which is still sufficiently resilient to be stretchable over the piston and to snap or contract into the stepped piston groove or circumferential recess 23. The reinforcing ring 22 closes the clearance space 8 and buttresses the ring 15 against extrusion into the space 8. The piston operating pressure is transmitted by the ring 15 to the ring 22 which is not extruded into the clearance space because of the groove shoulders 24 and 25 which absorb a part of the piston operating pressure. The absorption of pressure occurs because of the inherent resistance of the ring 22 to internal distortion. Thus, if the pressure on the ring 15 or piston face 10ᵃ is say 10,000 pounds per square inch, so that this force is transmitted to the shoulder 24, the pressure per square inch on the shoulder 25 will be somewhat less, and be less by the amount necessary to distort the ring 22 against the shoulder 25. In turn, the shoulder 25 will absorb a part of the piston operating pressure so that the force or pressure tending to urge the ring portion 26 into the clearance space 8 will be materially less than the pressure per square inch acting on the piston face 10ᵃ. The space between the end face of the portion 26 and the groove end face 27 permits distortion of the ring 22 without forcing it into the space 8.

The operation of the device of Figs. 1 to 4 is as follows: Oil or fluid admitted under pressure to the chamber 7 to move the piston 6 upward, will be transmitted through the clearance space 8 to the annular lip 19 and will also be admitted to the pressure chamber 17 through the ports 21. As soon as the pressure in chamber 17 is sufficient to overcome the resilience of the ring 15, the pressure will flatten the ring body 16 against the groove wall 10, thereby expanding the ring radially against the cylinder wall 2 to seal the space 8. The friction of the ring edge portion 18 on the wall 2 is reduced by making the portion 18 narrow and therefore the tendency of pieces of the ring corner at the face 19 to sluff or tear off is reduced. The tearing of the ring is further overcome by the buttressing flange 20, which provides a ring thickness inward of the cylinder wall engaging face sufficient to prevent tearing. The buttressing of the ring corner is further increased by the shoulder or step 14 which supports the flange 20. At the high pressure acting on the piston face 10ᵃ, the ring portion 18 would tend to be forced or extruded into the clearance space 8. This is overcome by the reinforcing ring 22 so the breaking of the upper corner of the ring portion 18 is prevented.

Figure 5:
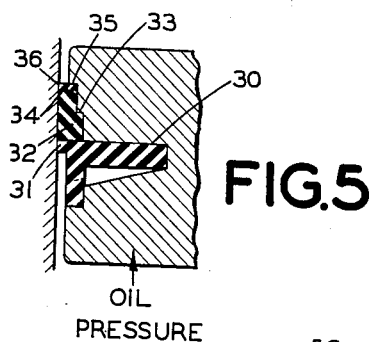
Fig. 5 is a view similar to Fig. 2, but showing another form of sealing means.

Referring to Fig. 5, the sealing ring 30 is substantially identical with the ring 15. The cylinder wall engaging lip 31 is backed by a reinforcing ring 32 which is substantially like the ring 22 but has only one pressure absorbing shoulder 33. The space between the ring end face 34 and the upper wall 35 of the reinforcing ring groove, contains and is filled by a washer or annular member 36 of harder rubber-like material, such as Ameripol, than the ring 32 which is harder than the ring 30. The term "harder" means a greater resistance to distortion. The sealing means of Fig. 5 therefore function as does that of Figs. 1 to 4, except that the washer or ring 36 reinforces the upper and outer corner of the ring 32 against extrusion into the clearance space. The wall 35 provides a shoulder absorbing a portion of the force transmitted by the ring 32 to the washer 36 so that the force tending to extrude the washer 36 into the clearance space is still further reduced. The ring 30 tightly fits in the groove base so that there is no play or longitudinal movement permitted.

Figure 2:
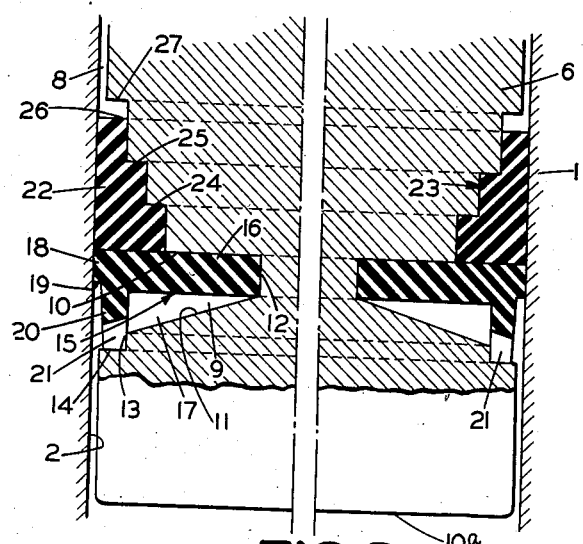
Fig. 2 is a greatly enlarged view in section on the line 2—2 of Fig. 1.
Figure 3:
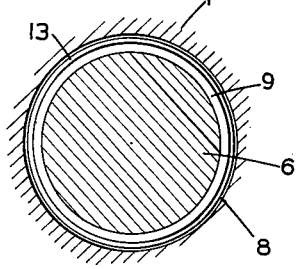
Fig. 3 is a view in section on the line 3—3 of Fig. 1, but with the sealing means removed.
Figure 4:
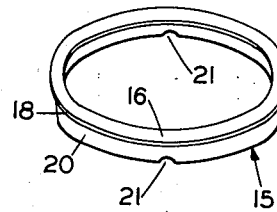
Fig. 4 is a detail view in perspective of the sealing ring of Fig. 1.
Figure 6:
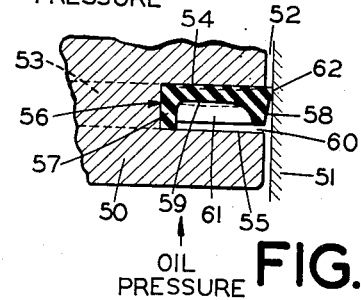
Fig. 6 is a detail view in longitudinal section through contiguous piston and cylinder walls showing another form of sealing ring in cross-section.

In Fig. 6, the sealing ring 40 is in a V-shaped groove 41 corresponding to the groove 9 of Fig. 2. The upper groove wall 42 which backs the ring 40 is inclined instead of normal to the piston axis or longitudinal center line. The ring 40 takes the dash-dot line position when not under pressure from the chamber 43 which is open to the piston operating pressure through the port 44 in the annular buttressing flange 45. The ring 40 has its cylinder wall engaging and sealing edge 46 tapering from its lower corner into the flange 45 so that the lower ring corner is directly reinforced or buttressed entirely across the clearance space. The inner periphery of the ring 40 fits the base of the groove 41, being of the same thickness as the width of the groove base. The radial width of the ring 40 is greater than the depth of the groove 40 plus the clearance space so that the piston operating pressure transmitted to the chamber 43 will radially expand the ring 40 into tight sealing engagement with the cylinder wall.

Figures 7, 8:
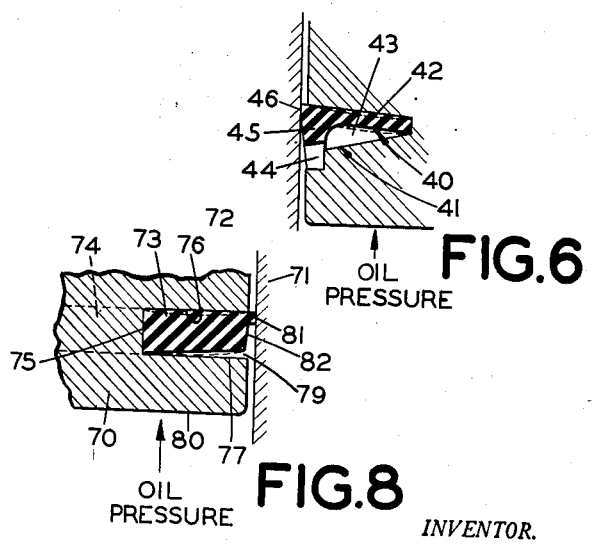
Fig. 7 is a view similar to Fig. 6, but showing still another form of ring.
Fig. 8 is a detail view in section showing still another form of ring.

In Fig. 7, the piston 50 is reciprocal in the cylinder 51, there being the usual radial clearance space 52 of say ten thousandths of an inch. In the piston 50 there is a circumferential groove or recess 53 having parallel upper and lower walls 54, 55 respectively. In the groove 53, which is about one hundred twenty-five thousandths of an inch deep, there is a sealing ring 56 of rubber-like material, such as Ameripol, having a hardness of say 60 durometer reading. The radial width of one side of the ring is about one hundred forty to one hundred fifty thousandths of an inch so that the ring is bowed as indicated by the dash-dot line when the ring is relieved of fluid pressure, that is, the ring is at all times under radial compression. The ring is of inverted channel or U-shape in cross-section, having annular inner and outer flanges 57, 58 respectively, joined by a web or base 59. The height of the ring at the flange 57 is equal to groove width so that the ring fits tightly in the groove at the groove base. The outer flange 58 terminates short of the groove bottom wall 55 to provide an opening or port 60 for admission of the piston operating fluid pressure from the clearance space into the pressure chamber 61 formed by the ring channel. The flange 58 buttresses the cylinder wall engaging edge or lip 62 of the ring 56 as above described. If the flange 58 should drop down against the wall 55, the piston operating pressure will push against the lip 62 and lift the ring so that pressure will be admitted through the port 60 to the chamber 61. Pressure in the chamber 61 will expand the ring radially to compress the lip 62 tightly against the cylinder wall, thereby sealing the clearance space. During upward or outward movement of the piston, the piston moving pressure, as in the other forms, holds the ring in its clearance sealing position wherein the ring web 59 is pressed flat against the groove wall 54. The narrow lip 62 reduces friction of the ring against the cylinder wall, thereby overcoming the tendency of the ring to stick and be damaged.

In Fig. 8, the piston 70 is reciprocal in a cylinder 71 with a substantial fit, the piston and cylinder walls being spaced by a clearance 72 of say ten thousandths of an inch. The clearance space 72 is closed by a sealing ring 73 of rubber-like material, such as Ameripol, having a hardness of about 60 to 80 durometer reading. The ring 73 is positioned in a circumferential piston groove 74 and fits the groove at the groove base 75. The upper and lower walls 76, 77 respectively, preferably diverge slightly, say at about 5 degrees to provide between the groove wall 77 and the ring 73, a pressure chamber 79 open to the clearance space 72 on the fluid pressure receiving side 80 of the piston. The ring is of greater radial cross-sectional width than the depth of the groove 74 plus the clearance space, as described in connection with Fig. 7, so that the ring is under radial compression against the cylinder wall. The ring has a circumferential lip or flange 81 extending from its top wall and frictionally engaging the cylinder wall. This lip is buttressed or reinforced by the ring thickness or body portion 82 in the same manner as the lip 62 by the flange 58. When pressure is applied to the piston face 80 to move the piston upward on its power stroke, the fluid under pressure enters the chamber 79 and flattens the ring from its bowed dash-dot position to its full line position against the wall 76. This flattening of the ring expands it radially outward, tightly sealing the lip 81 against the cylinder wall. The ring is held in its up position against wall 76 as the piston moves upward and therefore no fluid can leak through the clearance space. Tearing of the lower corner of the lip or flange 81 is prevented by the body portion 82. When pressure is released for downward or return stroke movement of the piston, the ring will bow downward to its dash-dot position, reducing the friction of the flange 81 against the cylinder wall. It will be apparent that the ring 73 could be tapered and the groove walls 76, 77 be parallel, in order to provide the chamber 79.

Having thus described the invention, what is claimed and desired to be secured by Letters Patent of the United States is:

1. In an apparatus of the character described, cooperable piston and cylinder members having a clearance space therebetween, said piston member being adapted to be driven by fluid pressure, one of said members having a circumferential groove opening into said space, a sealing ring of rubber-like material in said groove and having a narrow wiping face frictionally engaging the wall of the other of said members, said ring having a buttressing portion extending from adjacent said face on the driving pressure receiving side of said ring, said buttressing portion being spaced from contact with the wall of the other of said members and reinforcing said face against chipping.

2. In an apparatus of the character described, cooperable piston and cylinder members having a clearance space therebetween, said piston member being adapted to be driven by fluid pressure, one of said members having a circumferential groove opening into said space, a sealing ring of rubber-like material in said groove and having a circumferential lip with a narrow wiping face frictionally engaging the wall of the other of said members, said ring having a buttressing portion extending from said lip on the driving pressure receiving side of said ring, said buttressing portion being spaced from contact with the wall of the other of said members and reinforcing said lip against chipping.

3. In an apparatus of the character described, cooperable piston and cylinder members having a clearance space therebetween, said piston member being adapted to be driven by fluid pressure, one of said members having a circumferential groove opening into said space, a sealing ring of rubber-like material in said groove and having a narrow wiping face frictionally engaging the wall of the other of said members, said ring having a buttressing portion extending from adjacent said face on the driving pressure receiving side of said ring, said buttressing portion being spaced from contact with the wall of the other of said members and reinforcing said face against chipping, said one of said members having a circumferential stepped recess opening into said groove on its side opposite said buttressing portion and providing at least two annular shoulders spaced from the wall of said groove, a stepped annular backing member of rubber-like material in said recess and supporting said ring, said backing member extending across said clearance space and having a shoulder seating against the recess shoulder adjacent said groove.

4. In an apparatus of the character described, cooperable piston and cylinder members having a clearance space therebetween, said piston member being adapted to be driven by fluid pressure, one of said members having a circumferential groove opening into said space, a sealing ring of rubber-like material in said groove and having a narrow wiping face frictionally engaging the wall of the other of said members, said ring having a buttressing portion extending from adjacent said face on the driving pressure receiving side of said ring, said buttressing portion being spaced from contact with the wall of the other of said members and reinforcing said face against chipping, said one of said members having a circumferential stepped recess opening into said groove on its side opposite said buttressing portion and providing at least two annular shoulders spaced from the wall of said groove, a stepped annular backing member of rubber-like material in said recess and supporting said ring, said backing member extending across said clearance space and having a shoulder seating against the recess shoulder adjacent said groove, a second annular backing member in said recess and extending across said clearance space, said second backing member seating on another of said recess shoulders and supporting said first-named backing member and being of harder rubber-like material than said first-named backing member.

5. In an apparatus of the character described, cooperable piston and cylinder members having a clearance space therebetween, said piston member being adapted to be driven by fluid pressure, one of said members having a circumferential groove opening into said space, a sealing ring of rubber-like material in said groove and having a narrow wiping face frictionally engaging the wall of the other of said members, said ring having a buttressing portion extending from adjacent said face on the driving pressure receiving side of said ring, said buttressing portion being spaced from contact with the wall of the other of said members and reinforcing said face against chipping, the wall of said groove on the buttressing portion side of said ring terminating in a circumferential step at said clearance space, said buttressing portion comprising a flange seating on said step, and means to admit the fluid driving pressure to said groove behind said flange.

6. In an apparatus of the character described, cooperable piston and cylinder members having a clearance space therebetween, said piston member being adapted to be driven by fluid pressure, one of said members having a circumferential groove opening into said space, a sealing ring of rubber-like material in said groove and having a circumferential lip with a narrow wiping face frictionally engaging the wall of the other of said members, said ring having a buttressing portion extending from said lip on the driving pressure receiving side of said ring, said buttressing portion being spaced from contact with the wall of the other of said members and reinforcing said lip against chipping, said lip having a side face lying in the plane of the side face of said ring opposite said buttressing portion.

SERGIUS VERNET.

REFERENCES CITED

The following references are of record in the file of this patent:

UNITED STATES PATENTS

| Number | Name | Date |
|---|---|---|
| 1,122,246 | Beam | Dec. 29, 1914 |
| 1,569,308 | Smith | Jan. 12, 1926 |
| 1,581,484 | Deputy | Apr. 20, 1926 |
| 1,612,038 | Miller | Dec. 28, 1926 |
| 1,612,039 | Miller | Dec. 28, 1926 |
| 1,889,857 | Gardner | Dec. 6, 1932 |
| 2,233,030 | Penick | Feb. 25, 1941 |
| 2,284,424 | Hein | May 26, 1942 |
| 2,326,355 | Halstead | Aug. 10, 1943 |
| 2,349,170 | Jackman | May 16, 1944 |
| 2,368,744 | Carey | Feb. 6, 1945 |
| 2,383,959 | Dick | Sept. 4, 1945 |

FOREIGN PATENTS

| Number | Country | Date |
|---|---|---|
| 551,507 | England | Feb. 25, 1943 |